(12) United States Patent
Lee

(10) Patent No.: US 11,826,773 B2
(45) Date of Patent: Nov. 28, 2023

(54) CORRELATE THERMOGRAPHIC IMAGE DATA TO ONLINE SCANNING BASIS WEIGHT MEASUREMENT

(71) Applicant: Honeywell International Inc., Charlotte, NC (US)

(72) Inventor: Hyuongsun Lee, Seoul (KR)

(73) Assignee: Honeywell International Inc., Charlotte, NC (US)

( * ) Notice: Subject to any disclaimer, the term of this patent is extended or adjusted under 35 U.S.C. 154(b) by 305 days.

(21) Appl. No.: 17/216,567

(22) Filed: Mar. 29, 2021

(65) Prior Publication Data

US 2022/0305516 A1    Sep. 29, 2022

(51) Int. Cl.
*B05C 1/08* (2006.01)
*G01K 3/14* (2006.01)
*H04N 5/33* (2023.01)

(52) U.S. Cl.
CPC .......... *B05C 1/0895* (2013.01); *B05C 1/0834* (2013.01); *G01K 3/14* (2013.01); *H04N 5/33* (2013.01)

(58) Field of Classification Search
None
See application file for complete search history.

(56) References Cited

U.S. PATENT DOCUMENTS

| 3,681,595 | A | 8/1972 | Dahlin |
| 4,921,574 | A | 5/1990 | Hu |
| 4,943,721 | A | 7/1990 | Vidrine |
| 5,099,118 | A * | 3/1992 | Francis ................ G01N 33/346 250/359.1 |
| 5,795,394 | A | 8/1998 | Belotserkovsky |
| 8,596,861 | B2 | 12/2013 | Kane |
| 10,041,673 | B2 | 8/2018 | Pathangay |

(Continued)

FOREIGN PATENT DOCUMENTS

EP    0995076 B1    10/2002

OTHER PUBLICATIONS

Ostlund, "Towards total production monitoring of basis weight and moisture" Oct. 16, 2018.

(Continued)

*Primary Examiner* — Charles Capozzi
(74) *Attorney, Agent, or Firm* — Charles H. Jew

(57) ABSTRACT

Areal weight or thickness of a moving coated metal sheet along its entire cross directional width is derived by correlating thermographic image data to online, scanning basis weight measurements. Thermal imaging camera captures thermal images of a heated moving coated metal sheet material along a cross direction at a first position along the machine direction to generate sequential temperature profiles. Scanning beta gauge measures the areal weight of the moving coated metal sheet downstream at a second position. An infrared temperature sensor also measures the temperature of the moving coated metal sheet which is at a lower temperature at or near the second position. The temperature differential between the cross directional thermographic image data and the latter infrared temperature is a function of the basis weight. Basis weight measurements from the beta gauge is used to extrapolate cross directional basis weight data.

19 Claims, 4 Drawing Sheets

(56) References Cited

U.S. PATENT DOCUMENTS

2003/0108661 A1\* 6/2003 Linnonmaa ......... G01N 33/346
427/372.2
2009/0191327 A1 7/2009 Lotz
2020/0096380 A1 3/2020 Nebel

OTHER PUBLICATIONS

NDC Technologies, "NDA Technologies announces new sensors for Li-ion battery" (https://chargedevs.com) Feb. 22, 2019.
Akutsu et al. "EdgeEye: an Online Coating Position Gauge for Battery Electrolyte Sheets" Yokogawa Technical Report English Edition, vol. 57, No. 1, 2014.
Thermo Scientific "Solutions for Lithium-ion Battery" Aug. 21, 2013.
Wood, et al "Performance Effects of Electrode Coating Defects and IR Thermography NDE for High-Energy Lithium-ion Batteries" Annual Merit Review, Oak Ridge National Laboratory Jun. 8, 2016.
Sharp et al. "Lithium-ion battery electrode inspection using pulse thermography" NDT&E International 64 (2014) 41-51.
Mohanty et al. "Non-destructive evaluation of slot-die-coated lithium secondary battery electrodes by in-line laser caliper and IR-thermography methods" Anal. Methods, 2014, 6, 674.

\* cited by examiner

CORRELATE THERMOGRAPHIC IMAGE DATA TO ONLINE SCANNING BASIS WEIGHT MEASUREMENT

FIELD OF THE INVENTION

The present invention generally relates to measurement systems for determining properties of continuous sheet materials and, more particularly, to basis weight or thickness measurement techniques of sheet materials such as coated metal foils and substrates used to manufacture anodes and cathodes for lithium-ion electrochemical cells and batteries.

BACKGROUND OF THE INVENTION

On-line measurements are used to detect properties of sheet materials during manufacture to enable prompt control of the sheetmaking processes and, thus, to assure sheet quality while reducing the quantity of substandard sheet material which is produced. One of the main complications in making on-line measurements during sheetmaking is that the physical properties of sheet materials usually vary in the machine direction as well as in the cross direction. ("Machine direction" refers to the direction of travel of the sheet material during manufacture, and the term "cross direction" refers to the direction across the surface of a sheet perpendicular to the machine direction.)

To detect variations in sheet materials, scanning sensors are employed that periodically traverse back and forth across a sheetmaking machine in the cross direction while detecting values of a selected sheet property such as basis weight or caliper along each scan. Normally, the sheet being produced is traversed from edge to edge during each scan. The time required for a typical scan is generally between about twenty and thirty seconds or more depending on the cross-direction length which can be many meters. The rate at which measurement readings are provided by such scanners is usually adjustable; a typical rate is about one measurement reading every fifty milliseconds.

In practice, measurement information provided by scanning sensors is usually assembled after each scan to provide a "profile" of the detected sheet property in the cross direction. In other words, each profile is comprised of a succession of sheet measurements at adjacent locations in the cross direction. The purpose of the profiles is to allow cross-directional variations in sheet properties to be detected easily. Based upon the detected cross-directional variations in the detected sheet property, appropriate control adjustments may be made to the sheetmaking machine with the goal of reducing profiles variations both in the cross direction and in the machine direction.

A scanning sensor that periodically traverses a sheet at generally constant speed cannot measure the selected sheet property at locations which are aligned exactly, perpendicular to the longitudinal edges of the sheet. Because of the sheet velocity, scanning sensors actually travel diagonally across the sheet surface, with the result that consecutive scanning paths have a zigzag pattern with respect to the direction perpendicular to the longitudinal edges of sheet. In practice, it is typical to calculate an average of profile measurements over each scan. Such averages are often called "last" averages because they are calculated after each scan is completed. Thus, where the scanning rate is about twenty to thirty seconds per scan, last averages are available only about every twenty to thirty seconds. It is common to use last averages as well as cross-directional profile measurements for control purposes.

Instead of using a scanning sensor, an array of fixed-point sensors positioned across the sheet in the cross direction can be employed. Although this technique statistically satisfies the needs in many applications, it cannot measure the full width and length of the sheet because the number of fixed sensors is limited by cost and space limitations.

In the fabrication of electrodes for lithium-ion batteries, metal foil from metal rolls is continuously coated with a mixture of active material. To achieve and maintain the quality of continuous, roll-to-roll production of electrodes, there must be constant, online measurements of quality factors that are strongly linked to battery performance. Weight is most directly correlated to the quantity of the active particles, therefore uniform weight per unit area (areal weight) is a fundamental requirement for high quality electrodes. Prior scanning basis weight monitoring techniques can only directly measure the path of the scanning head and therefore yield basis weight data on a fraction of the finished roll.

SUMMARY OF THE INVENTION

The present invention addresses the need to increase the measured area of basis weight or thickness measurements by correlating thermographic image data to online, scanning basis weight measurements.

In one aspect, the invention is directed to a system of monitoring the formation of a traveling sheet of material, that moves in a machine direction (MD), which includes:
- a thermal imaging device, such as an infrared imaging camera, that is configured to capture a thermal image of the sheet material along a cross direction at a first position along the MD to generate sequential temperature profiles of the traveling sheet of material;
- means for measuring an areal weight of the traveling sheet of material at a second position along the MD that is downstream of the first position;
- a temperature sensor that is configured to measure the temperature of the sheet of material at a third position, wherein the second position is co-located with the third position or the second position is in the vicinity of the third position; and
- a controller that is configured to compute the areal weight of the traveling sheet of material along a cross direction (CD).

The traveling sheet material is at an elevated temperature at the first position where the thermal image is taken due to the proximity to the sheet exit point of a dryer in order to maximize thermal equilibrium across the sheet by limiting the effect of non-uniform sheet cooling once the sheet exits the dryer. Thermal image is directly translated to temperature measurements, effectively forming a series of cross directional "profiles." A scanning beta gauge can be employed to measure the areal weight at the second position and an infrared temperature sensor can be employed to measure the temperature of the traveling sheet material at the third position which closely corresponds to the location of the areal weight measurement with a known cross directional offset to the distance between the two sensors. It can be practically assumed that the areal weight and temperature measurements are taken from the same spot and the two measurements directly correlate the areal mass to temperature. The temperature differential between the cross directional thermographic image data and the latter surface temperature establishes the polynomial sheet cooling conditions between the first and second positions which are used to extrapolate cross directional basis weight data. That is, the cooling can be expressed as a polynomial equation. Using the mass to temperature relationship and the sheet cooling polynomial, one can derive a basis weight profile for every temperature profile data from the thermographic camera.

In another aspect, the invention is directed to a roll-to-roll sheet production system for coating a metal sheet with electrode material that includes:
  a continuous source of a sheet of metal substrate which moves in a machine direction (MD);
  a coater that is configured to apply a coat of electrode material onto the moving metal substrate to form a coated moving sheet;
  a thermal imaging camera, located downstream of the coater, which captures a thermal image of the coated moving sheet along a cross direction (CD) at a first position along the MD to generate sequential temperature profiles of the coated moving sheet;
  a beta gauge that is configured to measure the basis weight of the coated moving sheet of specific areas of the coated moving sheet, wherein the beta gauge is located downstream of the first position;
  a temperature sensor that is configured to measure the temperature of the coated moving sheet at or near the specific areas; and
  a processor that is configured to compute the basis weight of the coated moving sheet along a CD.

In a further aspect, the invention is directed to a method of calculating the weight per unit area of a composite coated sheet, which is moving in a machine direction (MD), that includes:
  (a) generating thermal image data of the composite coated sheet along a cross direction (CD) at a first position along the MD;
  (b) calculating the weight per unit area of the composite coated sheet of an interrogation spot located at a second position along the MD, which is downstream from the first position;
  (c) measuring the surface temperature of the composite coated sheet at or in the vicinity of the interrogation spot; and
  (d) computing the weight per unit area of the composite coated sheet along a CD of the composite coated sheet.

The present invention is particularly suited for quality control in the fabrication of electrodes for lithium-ion batteries where metal aluminum or copper foil from metal rolls is continuously coated with cathode active material or anode active material, respectively. The present technique provides manufacturers with quality measurement data at an early stage in the production process which affords better control of process conditions and reduce scrap rates.

DETAILED DESCRIPTION OF THE PREFERRED EMBODIMENTS

FIG. 1 illustrates a process for coating a metal web or sheet that is used in fabricating electrodes for lithium-ion electrochemical cells and batteries. For making anodes, the electrode coating includes anodic active materials such as graphite and, for making cathodes, the electrode coating includes cathodic active materials such as a lithium metal oxide. Electrodes include a current collector metal foil that is coated on both sides of the foil with electrode slurry which can also include carbon black, binder and solvent. After the electrode slurry is applied on a side of foil, the wet coated foil is heated in a dryer to extract the solvent to leave a solid layer of electrode material which adheres to the metal foil. Copper foil is a preferred anode current collector material and aluminum foil is a preferred cathode current collector material. The foil is typically 9 to 50 μm thick and the electrode coating ranges from 75 to 400 μm in thickness on one or both sides of the foil so that a double-side coated electrode can have a caliper of up to 850 μm with most being typically about 250 μm thick.

Figure 1A:
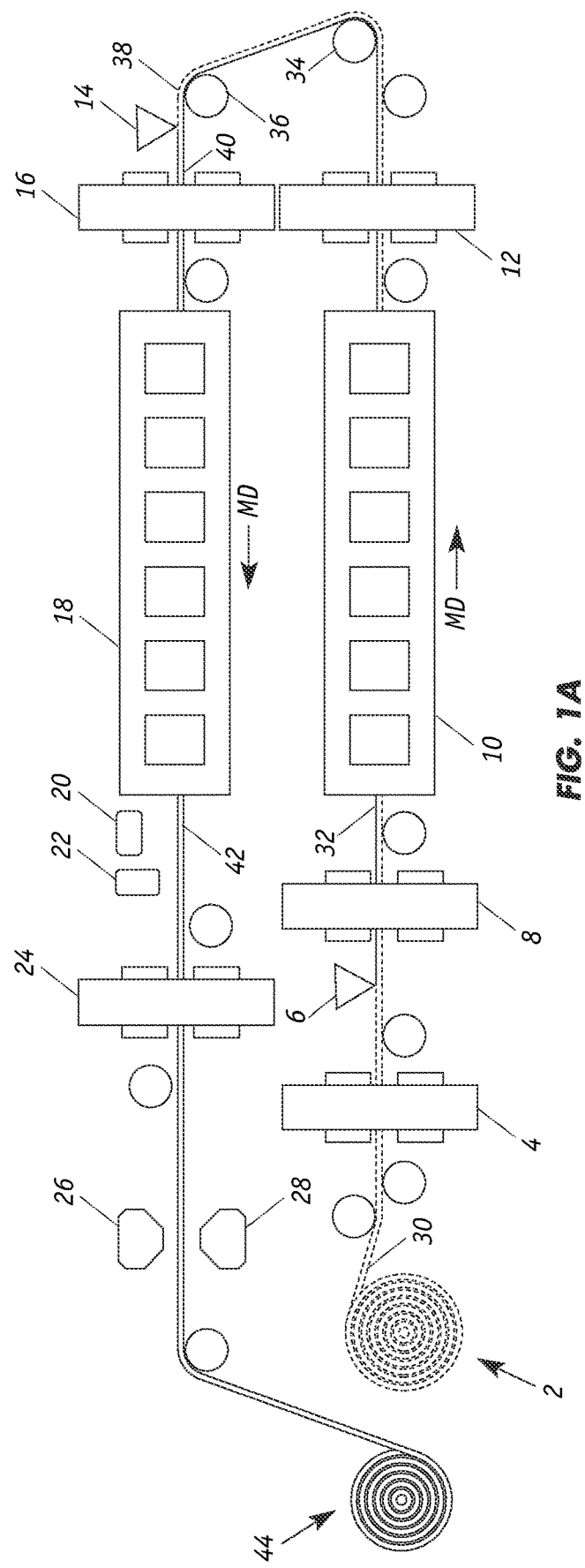
FIG. 1A depicts a roll-to-roll sheet production system for continuous coating of a metal substrate with anodic or cathodic materials.

As shown in FIG. 1A, roll 2 is unwound by an unwinder and supplies a continuous sheet of metal web or sheet 30 that is coated on the top surface with a layer of electrode slurry by coater 6 which can comprise a tape casting coating device. The basis weight, thickness and other characteristics of the sheet of metal web 30 from roll 2 are usually known; scanning beta gauges 4 and 8 are employed to measure the basis weight and/or thickness before and after the electrode slurry is applied by coater 6.

Coater 6 includes actuators that control the doctor blade to regulate the amount of slurry that is extruded onto sheet 30. Dryer 10 removes excess solvents and cures the slurry that is on the moving coated sheet 32 to form an electrode layer on the sheet. Scanning beta gauge 12 measures the basis weight and/or thickness of moving coated sheet exiting dryer 10. Thereafter rolling supports 34, 36 reverse the orientation of the moving sheet so that the uncoated side is on top whereupon coater 14 applies a layer of electrode slurry on the top uncoated surface of the moving sheet 38. The basis weight and/or thickness of the double-side coated sheet 40 are measured with beta gauge 16 before entering dryer 18.

The exiting moving coated sheet 42 can be heated with resistive heater 20 to a temperature of about 55 to 60° C. but if the thermal camera 22 is installed within about 1-2 meters from the exit of dryer 18, the coated sheet will be sufficiently heated so that heater 20 is not needed. Thermographic camera 22 (or cameras) detects the surface temperature across the width of the coated sheet 42 at frequent intervals to provide nearly continuous temperature profile data. The exact frequency and resolution of the data will depend on the performance specification of the camera. Further downstream, a beta gauge that is housed together with an infrared temperature sensor in a scanning device 24 measures the basis weight and/or thickness and the temperature of the coated sheet 42 as the scanning device 24 moves back and forth across the coated sheet 42. A rewinder takes up the double-side coated sheet 42 into roll 44. Surface defects on the coatings are monitored by camera-based web inspection systems 26, 28.

For monitoring the double-side coated sheet 42 with the present invention, thermographic image data of the coated sheet 42 is correlated and corrected with the online basis weight and/or thickness measurements of the coated sheet to generate more accurate basis weight and/or thickness calculations across the coated current collector along its entire cross direction.

Figure 1B:
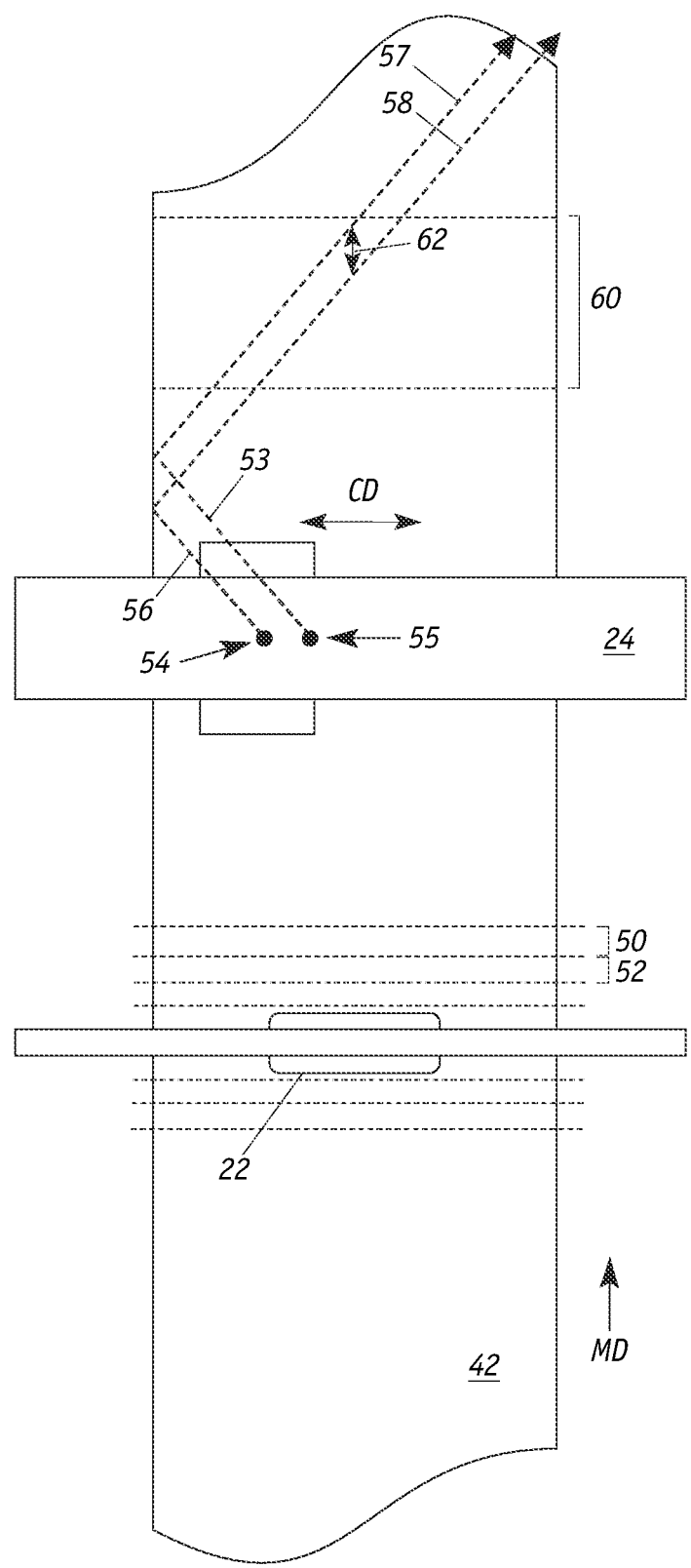
FIG. 1B is a plan view illustrating the operations of the thermographic image, temperature and basis weight measurements on a coated metal sheet.

FIG. 1B depicts the operations of stationery thermographic camera(s) 22 which measures the radiant infrared energy emitted by coated sheet 42 across the entire width of the coated sheet, that is, from edge to edge along the cross direction. The thermographic camera 22 generates a series of thermographic images Which can be superimposed to form a continuous thermographic image of the entire coated sheet 42. Linear tracks 50 and 52 depict two successive elongated sections or regions of the coated sheet 42 where thermographic data is photographed by thermographic camera 22.

Positioned downstream at a specific distance from the camera 22 is scanning device 24 that includes a beta gauge which measures the basis weight and/or thickness of the coated sheet 42. The scanning device periodically traverses coated sheet 42 generally at a constant speed. The beta gauge is shown measuring spot or area 54 of the coated sheet 42. The beta gauge does not measure the selected sheet property at locations which are aligned exactly perpendicular to the longitudinal edges of the sheet. Instead, because of the sheet velocity, the scanning device travel diagonally across the coated sheet surface, with the result that consecutive scanning paths have a zig-zag pattern with respect to the direction perpendicular to the longitudinal edges of coated sheet 42.

An example of such as zigzag pattern are scanning paths 56 and 58 which would be traced by the beta gauge as the scanning device 24 traverses the surface of sheet during back-and-forth consecutive scans. The angles of each of the scanning paths relative to the true cross-direction depend upon the cross-directional velocity of the scanning device and upon the machine-directional velocity of the coated sheet 42 which is known. The zigzag pattern covers a relatively small portion of the coated sheet 42 surface.

In addition to the beta gauge, scanning device 24 also houses an infrared temperature sensor that measures the temperature spot or area 55 of the coated sheet 42. That is, as the scanning device traverses back-and-forth over the moving coated sheet 42, the beta gauge and IR temperature sensor monitor locations 54 and 55, respectively, which are adjacent to each other. That is, spot 55 and laterally offset in the CD from spot 54. Thus, spot 55 defines zig-zag pattern scanning paths 53 and 57 which would be traced by the temperature sensor as the scanning device 24 traverses the surface of sheet during back-and-forth consecutive scans. The zigzag patterns 57 and 58 are separated by a MD offset 62; the distance of the MD offset depends on the separation between spots 54 and 55, the cross-directional velocity of the scanning device and upon the machine-directional velocity of the coated sheet 42.

Region 60 represents a part on the coated sheet 42 that has moved passed the scanning device 24. Since the speed of the coated sheet 42 moving in the machine direction is controlled and the distance between frame 14 and frame 16 is fixed, the time required for the coated sheet 42 travel from thermographic camera 22 and scanning device 24 can be computed. Thus, within region 60 along scanning patterns 58 and 57, the scanning device 24 has monitored (i) the basis weight and/or thickness with the beta gauge and (ii) the surface temperature with the IR temperature sensor. This information is used with the thermographic image data of region 60 to derived the basis weight and/or thickness distribution of the region.

Figure 2:
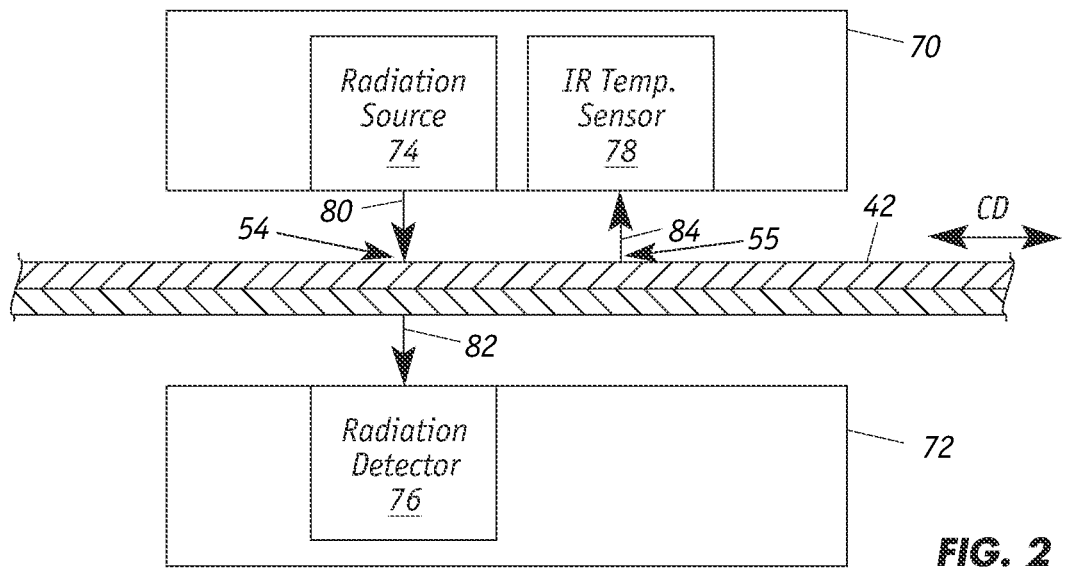
FIG. 2 depicts dual scanning heads with basis weight and temperature sensors.

The scanning device 24 (FIG. 1B) includes scanning heads 70, 72 which enclose or house radiation source 74 and radiation detector 76, respectively, as shown in FIG. 2. The radiation source 74 emits radiation 80 that is directed toward an area 54 on the coated sheet 42 which is moving in the machine direction. The intensity of the radiation 82 which is transmitted through the coated sheet is sensed by radiation detector 76. The detector senses the amount of radiation absorbed by the coated sheet which gives a direct indication of the basis weight of the material. Radiation source 74 preferably emits beta radiation for the measurement of basis weight or thickness. Scanner head 70 also houses an infrared sensor 78 with a spot size which is preferably smaller than 6 mm and response time of less than 100 msec and with a data rate exceeding 1 kHz in order to provide a sheet temperature profile with adequate resolution in the CD. As shown in FIG. 1B, the area where sheet temperature is measured by IR sensor 78 (FIG. 2) will be offset in the plus (+) or minus (−) MD direction depending on the CD direction of scan.

Beta gauges are nuclear measuring devices which emit beta rays. Typically, a single-layer composition, such as single-layer metal foil or electrode layer, has a known beta ray absorption coefficient and a known density. Using a beta gauge, the mass per unit area of the single-layer foil for instance, can be determined. That is, by multiplying the raw output of the beta gauge by the known adsorption coefficient, the mass per unit area can be calculated for each point on the foil to be measured. Similarly, the thickness at each such point corresponds to the mass per unit area divided by the known density. However, when using a beta gauge to measure mass and thickness of multilayer films or composite sheets such as coated metal substrates, the adsorption coefficient and density of each layer as well as the fractional composition of each layer must be considered in deriving a nominal composite adsorption coefficient for the multilayer film or composite sheet.

Figure 3:
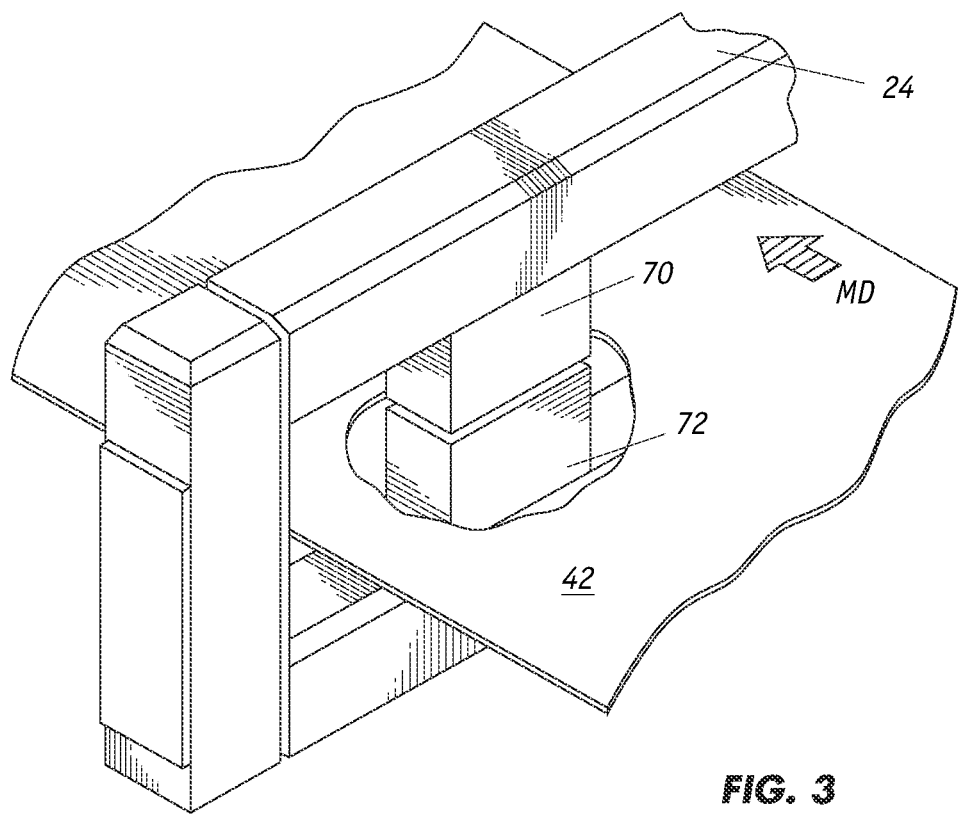
FIG. 3 depicts an online scanning system with dual scanning heads.

As illustrated in FIG. 3, the operative faces of the dual scanner heads 70, 72 define a measurement gap that accommodates coated sheet 42 which moves in the MD. The cross directional movement of the dual scanner heads is synchronized with respect to speed and direction so that they are aligned with each other. Because the coated sheet 42 is traveling in the MD, which is perpendicular to the cross direction, the measurements made by dual head scanner heads cover only a small area along the length of the coated sheet 42.

Figure 4:
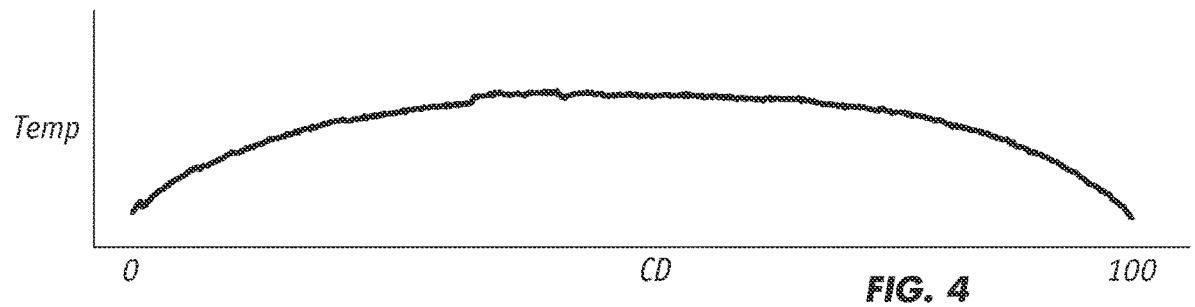
FIG. 4 is cross directional surface temperature of a coated that is derived from a thermographic image of a moving sheet.

During operation of the coating process shown in FIGS. 1A and 1B, as the coated sheet 42 exits dryer 18 thermographic images of coated sheet 42 are continuously captured by camera 22. For example, thermographic image data for successive sections 50, 52 of the moving coated sheet 42 is recorded. FIG. 4 is a representative surface temperature profile for section 50 that is derived from the thermographic image data. The graph depicts the surface temperature from one edge of the coated sheet 42 to the other edge along the cross direction. The CD distance from edge to edge is arbitrarily designated from 0 to 100. When the same section 50 passes by scanning device 24, the beta gauge measures the basis weight and/or thickness and the IR temperature sensor measures the surface temperature at adjacent or co-located positions of the coated sheet 42 along a zig-zag pattern.

Figure 5:
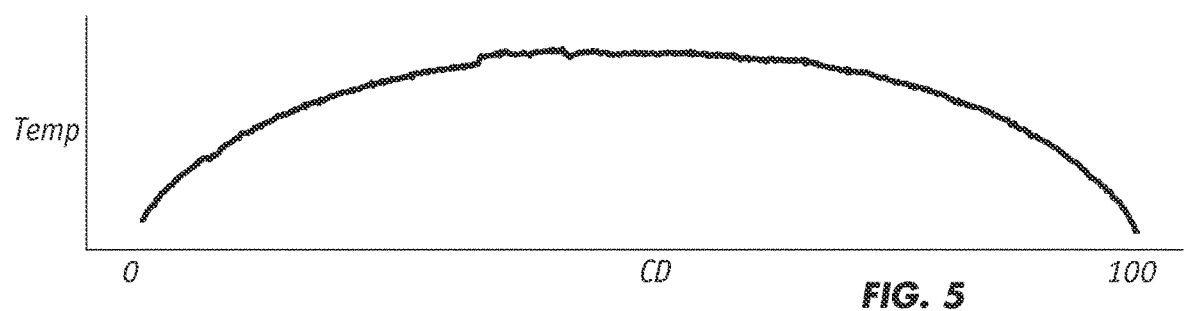
FIG. 5 is a cross directional surface temperature profile of a coated sheet.

FIG. 5 is a representative surface temperature profile of the same cross section of section 50 (FIG. 1B) of the coated sheet that is depicted in FIG. 4. The graph in FIG. 5 is derived by using the surface temperature that is measured at a specific location along the cross direction by the IR temperature sensor in scanning device 24 and calculating the temperature difference between the two surface temperatures. For example, if the downstream IR temperatures sensor measures the coated sheet at the midpoint along the cross direction, then that temperature is compared to the temperature at the midpoint shown in FIG. 4 which will be at a higher temperature. The graph in FIG. 5 has the same general profile as the graph in FIG. 4 except that the temperature in the former graph is lowered by the temperature differential as measured at the midpoint. FIGS. 4 and 5 also show edge effects in that the temperature at each end of moving sheet is lower due to the higher cooling rates at the outer borders of the sheet.

Figure 6:
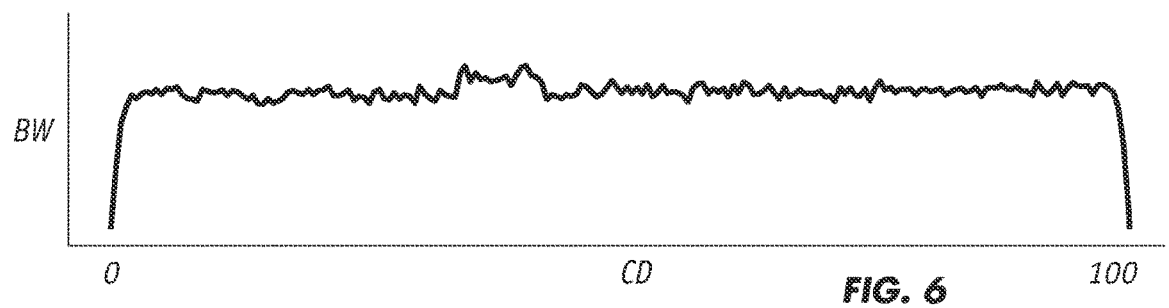
FIG. 6 is a cross directional basis weight profile.

FIG. 6 is a representative basis weight profile which is derived from the beta gauge measurement and applying the measurement to scale FIG. 5. In other words, the basis weight profile has the same general profile as the temperature graph shown in FIG. 5 but the beta gauge measurement of the single spot along the cross direction is used to scale the rest of the profile. In addition, the edge effects have been accounted for to yield a more accurate basis weight profile. A method of quantifying the cooling effects at the edges is to perform simulations using coated sheets or standards made of substrates of known thicknesses and applying coatings of known thicknesses thereon. These standards are heated in a dryer and subsequently undergo thermographic imaging, IR detection and beta gauge measurement. The standards are tested under different conditions including, for instance, dryer temperature, ambient temperature, speed of the moving sheet, distance between the IR thermographic camera and the downstream scanning device and other operating conditions. The cross directional temperature profiles generated using these standards permit analysis of the effects of edge cooling under different operating conditions. Mathematical relationships can be developed that models the effects of edge cooling. Alternatively, a library consisting of experimental results using different standards operating under various conditions can be used to formulate as calibration curves or a look-up table. In either case, when a basis weight cross directional profile is generated from a cross directional temperature profile, the edge effects can be compensated for to produce a more accurate basis weight profile. As shown in FIG. 6, the basis weight cross directional profile shows more uniformity when the edge effects are accounted for.

Figure 7:
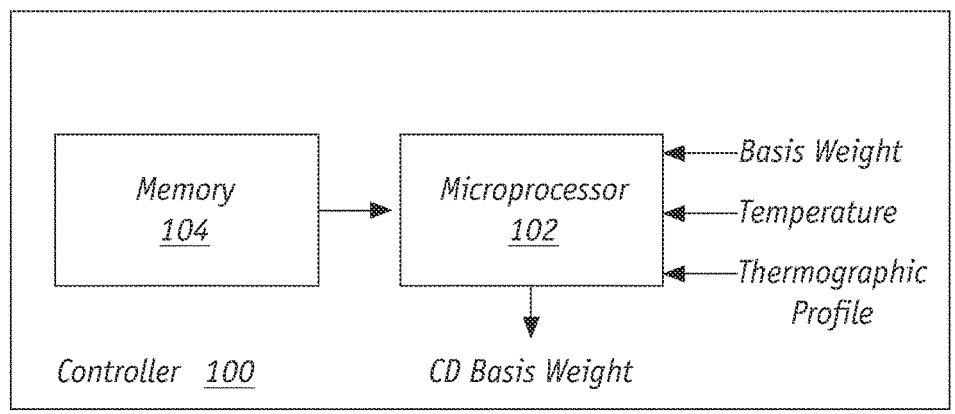
FIG. 7 depicts a controller with microprocessor and memory.

FIG. 7 depicts a process for controlling the manufacture of electrodes by continuously measuring the basis weight (or thickness) and corresponding temperature profiles from the scanning device (after the end of every scan) and the temperature profiles from the thermographic camera (e.g., every second). Digitized signals are fed to a computer 102. Memory 104 includes a library of calibration curves or look-up tables that is used to compensate for edge cooling effects in calculating the basis weight or thickness.

Controller 100 includes any hardware, software, firmware or combination thereof for performing the measurements in coating process shown in FIGS. 1A and 1B. Controller 100 could, for instance, include a microprocessor 102 and memory 104 storing instructions and data used, generated, and collected by the processor. The controller 100 regulates the coaters 6, 14 (FIG. 1A) in response to the CD basis weights in order to achieve the desired specifications.

While the invention has been illustrated in measuring characteristics of coated metal sheets, it is understood that the invention can be monitored moving sheets in general which include, but are not limited to, paper and plastic webs or sheets. In the case the sheet does not include a metal substrate, instead of using a nuclear gauge, the basis weight or thickness can be measured by a scanning infrared radiation sensor.

The foregoing has described the principles, preferred embodiments and modes of operation of the present invention. However, the invention should not be construed as being limited to the particular embodiments discussed. Thus, the above-described embodiments should be regarded as illustrative rather than restrictive, and it should be appreciated that variations may be made in those embodiments by workers skilled in the art without departing from the scope of the present invention as defined by the following claims.

What is claimed is:

1. A system of monitoring the formation of a traveling sheet of material, that moves in a machine direction (MD), which comprises:
    a thermal imaging device that is configured to capture a thermal image of the sheet material along a cross direction (CD) at a first position along the MD to generate sequential temperature profiles of the traveling sheet of material;
    means for measuring an areal weight of the traveling sheet of material at a second position along the MD that is downstream of the first position;
    a temperature sensor that is configured to measure the temperature of the sheet of material at a third position; and
    a controller that is configured to compute the areal weight of the traveling sheet of material along the CD wherein the controller is configured to use the areal weight measured at the second position and a temperature measurement by the temperature sensor at the third position to correlate the sequential temperature profiles into cross directional areal weight distribution profiles of the traveling sheet of material.

2. The system of claim 1 wherein the controller is configured to compute the cross directional areal weight distribution profiles of the traveling sheet of material along substantially the entire width of the traveling sheet.

3. The system of claim 1 wherein the means for measuring an areal weight of the traveling sheet comprises a scanner sensor that traverses back and forth along the CD across the traveling sheet of material as the traveling sheet moves in the MD.

4. The system of claim 3 wherein the scanner sensor includes a radiation source that directs radiation towards the traveling sheet of material and a radiation detector that detects radiation that is transmitted through the traveling sheet of material.

5. The system of claim 3 wherein the radiation source is beta radiation source.

6. The system of claim 1 wherein the thermal imaging device comprises an infrared camera and the temperature sensor comprises an infrared temperature sensor that measures the temperature of the sheet of material.

7. The system of claim 1 comprising means for heating the traveling sheet at the first position or upstream thereof.

8. The system of claim 1 wherein the traveling sheet of material comprises a metal layer.

9. The system of claim 8 wherein the traveling sheet of material comprises a metal substrate that is coated with an anode or cathode material.

10. A roll-to-roll sheet production system for coating a metal sheet with electrode material that comprises:
- a continuous source of a sheet of metal substrate which moves in a machine direction (MD);
- a coater that is configured to apply a coat of electrode material onto the moving metal substrate to form a coated moving sheet;
- a thermal imaging camera, located downstream of the coater, which captures a thermal image of the coated moving sheet along a cross direction (CD) at a first position along the MD to generate sequential temperature profiles of the coated moving sheet;
- a beta gauge that is configured to measure the basis weight of the coated moving sheet at specific areas of the coated moving sheet, wherein the beta gauge is located downstream of the first position;
- a temperature sensor that is configured to measure the temperature of the coated moving sheet at or near the specific areas; and
- a processor that is configured to compute the basis weight of the coated moving sheet along the CD wherein the processor is configured to use the basis weight measured by the beta gauge and a temperature measurement by the temperature sensor to correlate the sequential temperature profiles into cross directional basis weight distribution profiles of the coated moving sheet.

11. The system of claim 10 wherein the beta gauge and temperature sensor are secured to a scanner that traverses back and forth along the CD across the coated moving sheet and wherein the beta gauge and temperature sensor are configured to detect radiation at substantially the same specific areas simultaneously.

12. The system of claim 10 wherein the coated moving sheet comprises a substrate that has a first side which is coated with electrode material and a second side which is coated with electrode material.

13. The system of claim 10 wherein the processor is configured to compute the cross directional basis weight distribution profiles of the coated moving sheet along substantially the entire width of the coated moving sheet.

14. The system of claim 10 wherein the beta gauge comprises a scanner sensor that traverses back and forth along the CD across the coated moving sheet as the coated moving sheet moves in the MD.

15. The system of claim 14 wherein the scanner sensor includes a radiation source that directs radiation towards the coated moving sheet and a radiation detector that detects radiation that is transmitted through the coated moving sheet.

16. The system of claim 10 wherein the temperature sensor comprises an infrared temperature sensor that measures the temperature of the coated moving sheet.

17. The system of claim 10 comprising means for heating the coated moving sheet at the first position or upstream thereof.

18. The system of claim 10 wherein the processor is configured to compensate for higher cooling rates at edges of the coated moving sheet than at a midpoint of the coated moving sheet in computing the basis weight of the coated moving sheet along the CD.

19. The system of claim 10 wherein the thermal imaging camera is configured to generates a thermographic map of a section of the coated moving sheet and the processor is configured to develop a corresponding basis weight map of the section.

* * * * *